US006286049B1

(12) United States Patent
Rajakarunanayake et al.

(10) Patent No.: US 6,286,049 B1
(45) Date of Patent: Sep. 4, 2001

(54) SYSTEM AND METHOD FOR PROVIDING BROADBAND CONTENT TO HIGH-SPEED ACCESS SUBSCRIBERS

(75) Inventors: Yasantha N. Rajakarunanayake, San Ramon; Gregory F. Wetzel, San Jose, both of CA (US)

(73) Assignee: Covad Communications Group, Inc., Santa Clara, CA (US)

( * ) Notice: Subject to any disclaimer, the term of this patent is extended or adjusted under 35 U.S.C. 154(b) by 0 days.

(21) Appl. No.: 09/535,047

(22) Filed: Mar. 24, 2000

(51) Int. Cl.[7] .................................................. G06F 13/00
(52) U.S. Cl. ............................................. 709/227; 709/238
(58) Field of Search ..................................... 709/200, 203, 709/206, 212, 216, 217, 218, 219, 223, 227, 238

(56) References Cited

U.S. PATENT DOCUMENTS

| | | | |
|---|---|---|---|
| 5,712,903 | * | 1/1998 | Bartholomew et al. ............... 379/89 |
| 5,790,548 | * | 8/1998 | Sistanizadeh et al. ............... 370/401 |
| 5,870,474 | * | 2/1999 | Wasilewski et al. ................. 380/21 |
| 5,920,626 | * | 7/1999 | Durden et al. ...................... 380/10 |
| 6,038,594 | * | 3/2000 | Puente et al. ...................... 709/217 |
| 6,173,399 | * | 1/2001 | Gilbrech .............................. 713/153 |

* cited by examiner

Primary Examiner—Moustafa M. Meky
(74) Attorney, Agent, or Firm—Jung-hua Kuo

(57) ABSTRACT

Systems and methods for providing broadband content to high-speed access subscribers with layer 4-7 switching are disclosed. The system generally comprises an enhanced services complex (ESC) having at least one content server having Internet content stored or cached therein and a broadband access gateway (BAG) in communication with the ESC and to at least one Internet service provider (ISP), where the BAG is configured to transmit and receive data traffic to and from a client premise equipment (CPE) at a client premise, respectively. The BAG is configured to selectively route data traffic received from the CPE to an ESC content server or the ISP based on multiple instances of the content destination address. The method generally comprises routing client data packets from a CPE to a BAG in communication with at least one ISP and an ESC having at least one content server, selectively routing each client data packet from the BAG to the ESC or the Internet, and routing content data packets from the Internet content or the content server to the CPE.

32 Claims, 5 Drawing Sheets

SYSTEM AND METHOD FOR PROVIDING BROADBAND CONTENT TO HIGH-SPEED ACCESS SUBSCRIBERS

BACKGROUND OF THE INVENTION

1. Field of the Invention

The present invention relates generally to the provision of broadband content to a subscriber. More specifically, systems and methods for providing broadband content to high-speed access subscribers with layer 4-7 switching are disclosed.

2. Description of Related Art

An Internet user typically accesses the Internet by subscribing to an Internet Service Provider ("ISP"). The ISP accesses the Internet and transmits desired Internet content between the Internet user and the Internet content provider.

The Internet user may also subscribe to high speed access to provide connection between the subscriber or client and the ISP to which the client subscribes. One example of high-speed access is via a digital subscriber line ("DSL"). The DSL is generally provided by means of a connection-oriented packet network which provides connectivity among remote users or client premises and the Internet via ISPs. In a packet-based switching network, data to be transmitted is broken up into a number of packets and transmitted between client premise equipment ("CPE"), e.g., a modem, at the Internet user's site and the Internet content provider.

The connection-oriented packet network includes a DSL loop using a pair of twisted copper telephone lines extending between the CPE and a central office ("CO") of a telephone company such as an incumbent local exchange carrier ("ILEC"). Both competitive local exchange carriers ("CLECs") and ILECs can provide DSL service to clients. For purposes of discussion and clarity only, it is assumed that DSL service is provided by only one ILEC.

The connection-oriented packet network further includes an ATM or Frame Relay network comprising ATM or Frame Relay network switches. The network switches facilitate in establishing virtual circuits ("VC") between each client and the ISP to which the corresponding client subscribes. The VC between each client and the ISP to which the corresponding client subscribes establishes connectivity between each client and the Internet via the respective ISP.

However, although a client may have high-speed connection to the ISP, intermediate connections or links between the ISP and the Internet and within the Internet may nonetheless be relatively slow, resulting in an overall slow connection. Thus, what is needed is a system and method for providing broadband content to high-speed access subscribers that is not limited or is less limited by such slow intermediate connections or links.

SUMMARY OF THE INVENTION

Systems and methods for providing broadband content to high-speed access subscribers with layer 4-7 switching are disclosed. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

The method generally comprises routing client data packets from a client premise equipment (CPE) at a client premise to a broadband access gateway (BAG), the BAG being in communication with at least one Internet service provider (ISP) and an enhanced services complex (ESC) having at least one content server, selectively routing each client data packet from the BAG to one of the Internet via the ISP and the ESC, routing the client data packet to an Internet content in communication with the Internet where the client data packet is selectively routed to the Internet via the ISP, routing the client data packet to one of the content servers having Internet content stored therein where the client data packet is selectively routed to the content server via the ESC, routing content data packets from one of the Internet content and the content server to the CPE.

It is to be understood that although the term "switching" is typically used in conjunction with ATM cells while the term "routing" is typically used in conjunction with IP packets, these terms are used in a generic, interchangeable sense herein.

The routing of the client data packets from the CPE to the BAG may be via switches in a network and the network may be a wireless, DSL, and cable network, for example. The selectively routing of each client data packet from the BAG to the Internet or the ESC includes determining the routing of the client data packet based upon a destination address of the client data packet and upon a destination address filter and may be achieved by destination redirection of the client data packet where the client data packet is routed to the ESC and/or by translation of a destination address of the client data packet to a substitute destination address where the client data packet is routed to the ESC. The destination address translation preferably utilizes layer 4 switching and the substitute destination address is optionally the address of the content cached in the content server.

The BAG may be in communication with a plurality of ISPs, each client data packet being associated with one of the ISPs and each ISP corresponding to a router of the BAG. Preferably, the BAG routers are virtual routers. Thus the routing of the client data packet to the content server may include translating a client source address of the client data packet to a substitute client source address for facilitating routing of the content data packet from the ESC to the CPE via the BAG router corresponding to the ISP associated with the client data packet. The routing of the content data packets from the content server to the CPE includes translating the substitute client equipment address of the client data packet to the client equipment address to identify the ISP with which the client data packet is associated. Further, translating the substitute client equipment address of the client data packet to the client equipment address may be performed by layer 4-7 switches of the ESC.

The routing of each client data packet from the BAG to the Internet via the ISP may include providing a virtual circuit (VC) between each ISP and a corresponding one of at least one functionally divided virtual gateway of the BAG. In addition, the routing the client data packets from the CPE to the BAG may include providing a VC between each CPE and a corresponding one of the functionally divided virtual gateways of the BAG. Further, the selective routing of each client data packet from the BAG to the ESC may include providing connectivity between each of the functionally divided virtual gateways of the BAG and at least a portion of the content servers corresponding to the virtual gateway. The routing of the client data packet to the content server may be via routers and layer 4-7 switches of the ESC.

The network for providing broadband content to high speed subscribers generally comprises an ESC having at least one content server having Internet content cached therein and a BAG in communication with the ESC and to at least one ISP, the BAG is configured to transmit and receive data traffic to and from a CPE at a client premise, respectively. The BAG is configured to selectively route data traffic received from the CPE to one of the ESC content servers and the ISP based on multiple instances of the content destination address, i.e., there can be multiple copies of the content identified by an Internet address and that the instance of the Internet address nearest could be used to satisfy the request.

The network may also include a network of switches in communication with the BAG, the data traffic to and from the CPE being directed through the network of switches, such as ATM switches, where the network can be any type of network such as a wireless, DSL, or cable network. The network may further include a gateway-client VC extending between the BAG and the CPE via the network of switches, the client-gateway VC being configured to transmit data traffic between the BAG and the CPE. The ESC may include switches in communication with the content servers and routers in communication with the switches and the BAG, where the switches are configured to execute switching utilizing any of layers 4-7.

The network may further include a gateway-ISP link extending between the BAG and the ISP and/or a gateway-content server connection extending between the BAG and the content servers. In particular, the gateway-ISP VC may be configured to transmit data traffic between the BAG and the ISP and the gateway-content server connection may be configured to transmit data traffic between the BAG and the content servers. The network may include an access multiplexer in communication with the CPE and the network of switches, the access multiplexer being configured to route data traffic between the CPE and the BAG. The access multiplexer may be a DSLAM (digital subscriber line access multiplexer).

The BAG may include a first and a second virtual gateway and the network may also include a first and a second gateway-ISP connection each extending between a respective virtual gateway and a corresponding ISP and configured to transmit data traffic therebetween.

These and other features and advantages of the present invention will be presented in more details in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DESCRIPTION OF SPECIFIC EMBODIMENTS

Systems and methods for providing broadband content to high-speed access subscribers with layer 4-7 switching are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention may not be described or shown in detail so as not to unnecessarily obscure the present invention.

Overview of an ATM Packet Network Architecture

Figure 1:
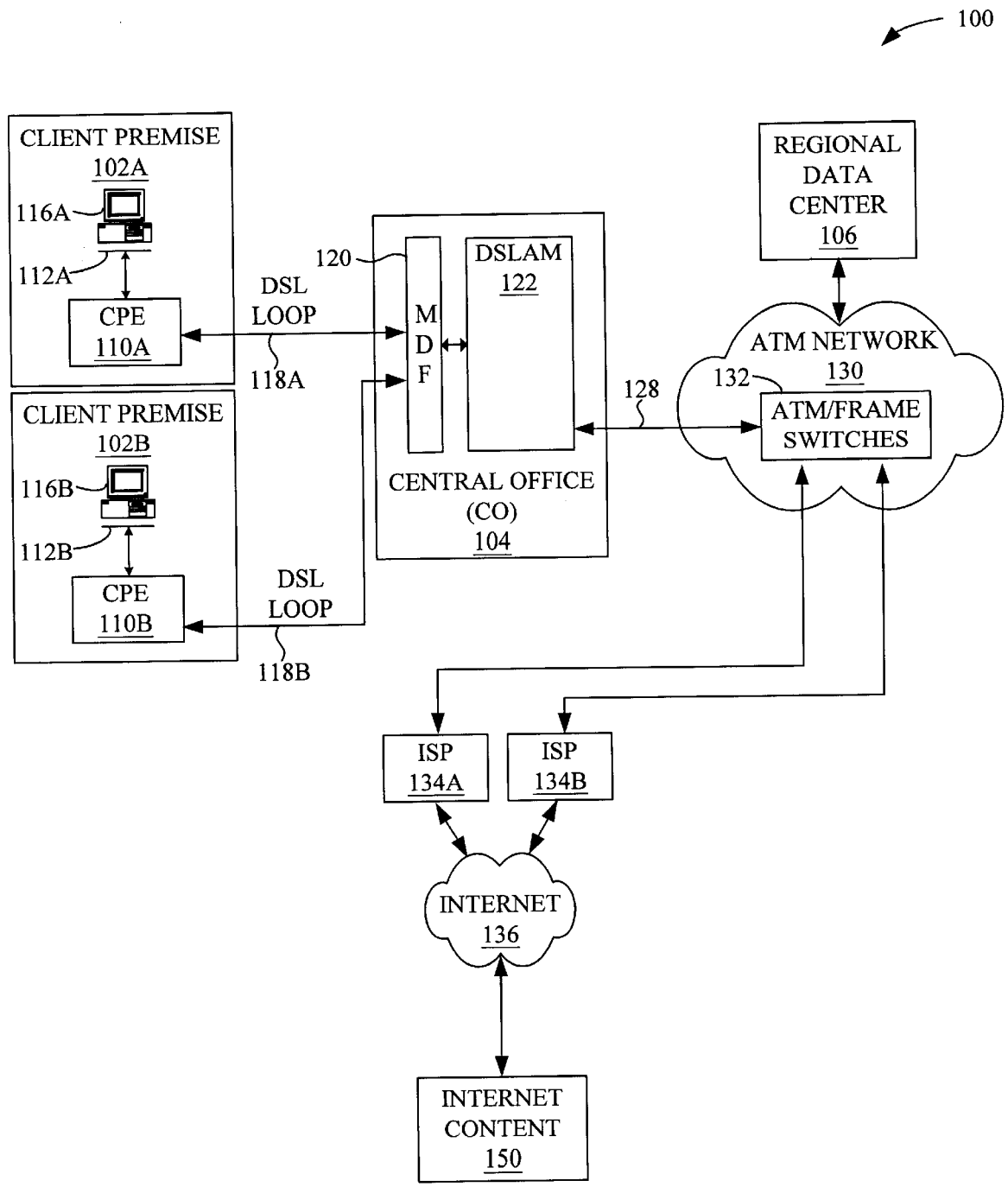
FIG. 1 is a block diagram illustrating a typical architecture of an ATM packet network.
Figure 2:
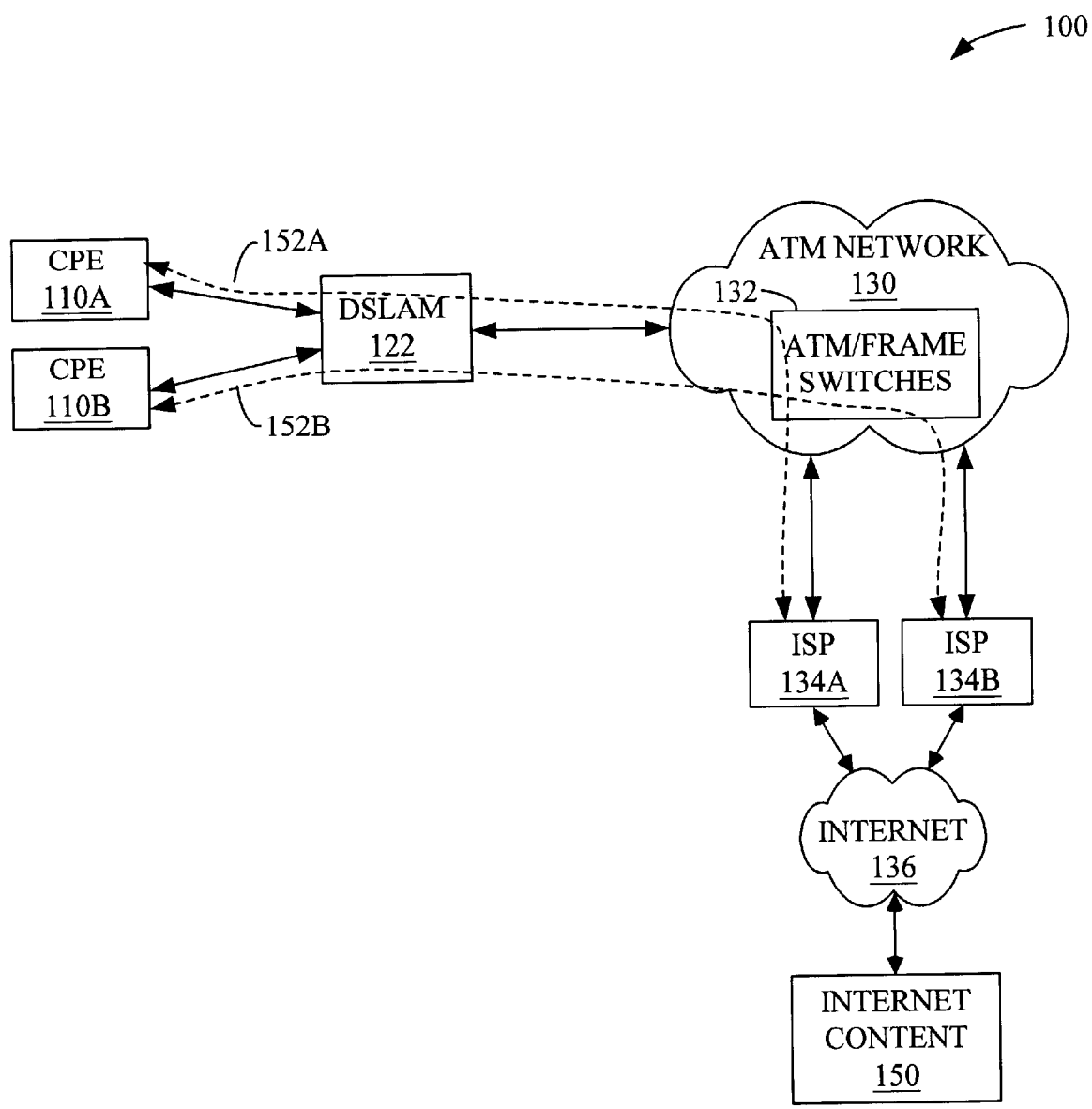
FIG. 2 is a block diagram illustrating a portion of the packet network architecture.

Prior to describing in detail the systems and methods for providing broadband content to high-speed access subscribers with layer 4-7 switching, a general overview using a typical architecture of an ATM packet network as an example will be presented with reference to FIGS. 1 and 2 and will serve as a basis for subsequent discussions of the systems and methods for providing broadband content to high-speed access subscribers with layer 4-7 switching.

FIG. 1 shows a block diagram illustrating a typical architecture of an ATM packet network 100. The ATM packet network 100 generally comprises connections among equipment at client, customer, or subscriber premises 102, a switching station or a central office ("CO") 104, and an ATM network 130 interfaced with a regional data center 106. A CPE 110 having a data port is provided at each client premise 102. A LAN or Ethernet 112 at the client premise 102 may be connected to the data port of the CPE 110. A computer 116 may be connected to the LAN 112. Layer 3 switching is typically utilized between the CPE and the computer 116.

The CPE 110 at the client premise 102 is connected to a DSL link or loop 118 over a twisted pair of copper phone lines which are in turn connected to a main distribution frame ("MDF") 120 in the central office 104. The MDF 120 simply serves to aggregate various twisted pairs of copper phone lines from various client premises within a certain geographical region.

CPEs at numerous client premises may be interfaced with a single CO 104 via DSL loops 118. For illustrative purposes, two CPEs 110A, 110B at client premises 102A, 102B connected via DSL loops 118A, 118B, respectively, to the same central office 104 are shown in FIG. 1. In particular, CPE 110A at client premise 102A serves as an interface between the DSL loop 118A and LAN 112A. LAN 112A is in turn connected a computer 116A. Similarly, CPE 110B at client premise 102B serves as an interface between the DSL loop 118B and LAN 112B. LAN 112B is in turn connected a computer 116B.

The DSL loops 118 over twisted pairs of copper wires are connected to a DSL access multiplexer ("DSLAM") 122 via the MDF 120 in the CO 104. The DSLAM 122 includes a plurality of ATM interconnect ports, such as xDSL ports, for implementing ATM methodologies to which the DSL loops 118 are connected. The term xDSL refers to all types of DSL including asymmetric DSL ("ADSL"), symmetric or single-line DSL ("SDSL"), rate adaptive DSL ("RADSL"), high-bit-rate DSL ("HDSL"), very high-bit-rate DSL ("VDSL"), and integrated services digital network ("ISDN") DSL ("IDSL"). Signals transmitted via the DSL loops 118 to and from the client premises 102 are multiplexed through the DSLAM 122 along with signals from other client premises (not shown).

The DSLAM 122 of the central office 104 connects to an ATM switch 132 in the ATM network 130 via a Time Division Multiplexed ("TDM") link 128, such as a DS-3 or STS-3c link. In other words, the DSLAM 122 multiplexes the ATM signals from multiple DSL lines onto a high-capacity transmission line for providing an ATM protocol connection between the DSL lines, such as DSL line 118A, 118B, and the ATM network switch 132 in the ATM network 130. As is well known in the art, the ATM network 130 typically includes a plurality of interconnected ATM network switches 132. Although ATM technology is illustrated and described herein as the exemplary technology, it is to be understood that other suitable technologies, such as Frame Relay, may be utilized.

Data packets are transmitted between the ATM network 130 and the Internet 136 via the ISPs 134. As shown, multiple ISPs 134 interface with the ATM network 130. The particular ISP 134 utilized as the interface to the Internet 136 for a given CPE 102 is determined by the particular ISP 134 to which the corresponding client subscribes. For example, client premise 102A may subscribe to Internet access via ISP 134A and client premise 102B may subscribe to Internet access via ISP 134B. Generally, an ATM virtual circuit ("VC"), such as a permanent virtual circuit ("PVC"), soft or smart PVC ("SPVC"), or switched virtual circuit ("SVC"), is established between each CPE 110 and the corresponding ISP 134. The PVC typically utilizes layer 2 switching. Content from Internet content or content farm 150, identified by an Internet protocol address, is provided to the Internet 136 by various content providers.

Although FIG. 1 illustrates a single DSLAM 122 interfacing with the ATM network 130, multiple DSLAMs 122 at multiple COs 104 may optionally interface with the ATM network 130. In other words, traffic from a number of central offices may be aggregated on the ATM network 130 to form a local or regional network. The local or regional network is generally provided within a region. In particular, for each region, a regional data center, in communication with and interfacing with each of the COs within the region, may be located at a central location within the region. In addition, because the ATM network is a distributed network, only a few regional data centers need to be provided for hundreds of COs. For example, in the San Francisco Bay Area, only a few regional data centers may need to be provided to interconnect many or all the COs in the entire area. Thus, the local or regional network includes the regional data center 106, the ATM network 130, the COs 104 in communication with the ATM network 130, as well as the interconnections between each of the COs 104 and the regional data center 106 via the ATM network 130.

FIG. 2 shows a block diagram illustrating a portion of the packet network architecture 100 of FIG. 1. As noted above, an ATM VC such as a PVC 152 is typically established between each CPE 110 and the ISP 134 to which the corresponding client subscribes. In the example shown in FIG. 2, a PVC 152A is established between CPE 110A and ISP 134A to which the corresponding client subscribes. In addition, a PVC 152B is established between CPE 110B and ISP 134B to which the corresponding client subscribes. The clients thus have access to the Internet content 150, identified by an Internet Protocol address, from the Internet 136 and the ISPs 134 via the PVCs 152.

As noted, access to the Internet content 150 via the Internet 136 with routing through the ISPs 134 can be relatively slow even when high speed access to the ISP 134 is provided to the client, such as with DSL service. The slowest or one of the slowest link is typically the link between the ISP 134 and the Internet 136.

Configuration of Network for Providing Broadband Content to High-Speed Access Subscribers A general overview of a typical ATM network architecture having been presented, the systems and methods for providing broadband content to high-speed access subscribers with layer 4-7 switching will now be described in more detail with reference to FIGS. 3–5. The ATM network architecture utilizing layer 4-7 switching to provide broadband content to high-speed access subscribers increases the speed of access to the Internet content. Specifically, the ATM network architecture utilizing layer 4-7 switching locates certain Internet content closer to the high-speed subscriber in order to provide broadband content to the high-speed subscribers.

Figure 3:
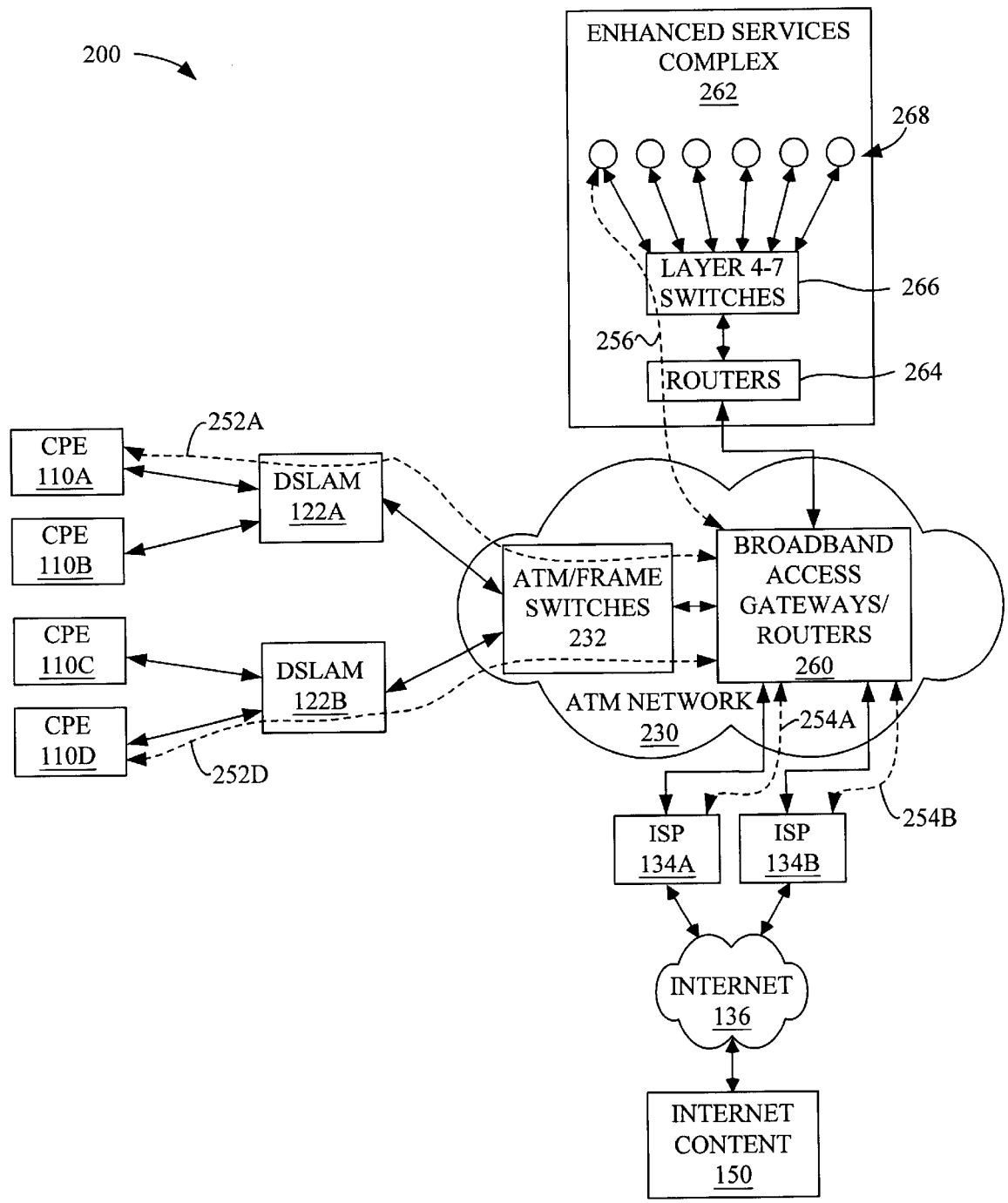
FIG. 3 is a block diagram illustrating a portion of a packet network architecture utilizing an enhanced services complex.
Figure 4:
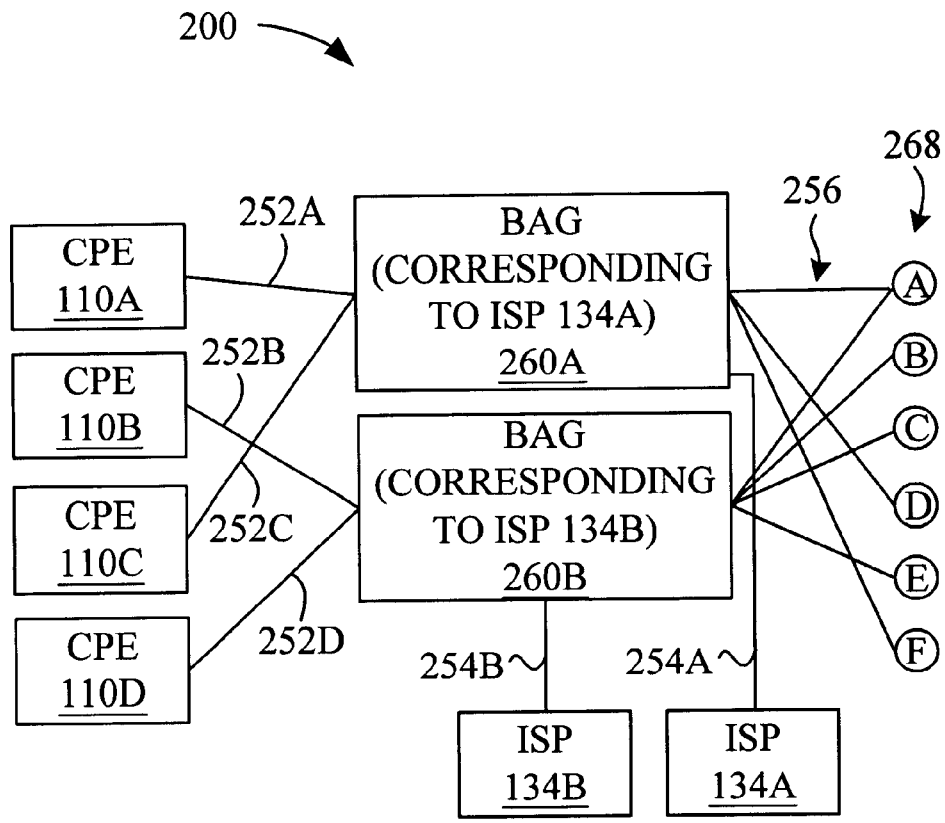
FIG. 4 is a block diagram illustrating the routing among the CPEs, broadband access servers (BAGs), and the contents servers.
Figure 5:
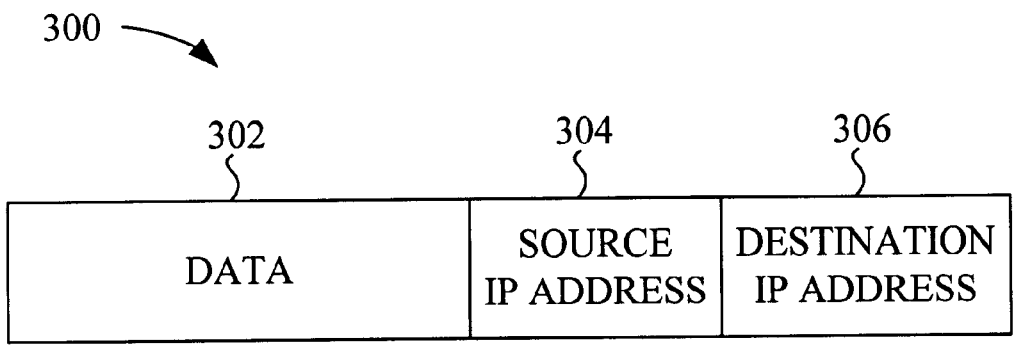
FIG. 5 is a schematic of a packet containing data, a source IP address, and a destination IP address.

FIG. 3 shows a block diagram illustrating a portion of an ATM packet network 200 for providing broadband content to high-speed access subscribers with layer 4-7 switching and FIG. 4 is a block diagram illustrating the routing of the PVCs among the components of the ATM packet network 200. As is known in the art, layer 4-7 correspond to layers relating to the content, namely, transport (e.g., TCP or UDP), session, presentation and application layers, respectively.

As shown, the ATM packet network 200 provides interconnections between DSLAMs 122, an ATM network 230, an enhanced services complex 262, and ISPs 134. Although only one enhanced services complex 262 and only one ATM network 230 are shown, it is to be understood that a plurality of enhanced services complexes 262 may interface with one or more ATM networks 230.

The ATM packet network 230 includes ATM switches 232 and one or more broadband access gateways ("BAGs") or routers 260. In particular, current router vendors are building equipment that can be partitioned into multiple virtual routers. These virtual routers are often used to connect to specific entities such as corporations or ISPs.

The BAGs 260 interface between the ATM switches 232 as well as with the enhanced services complex 262 and the ISPs 134. In addition, each BAG 260 serves to interface with a specific ISP 134. Although the BAGs 260 are schematically shown to be within the ATM network 230, it is to be understood that both the BAGs 260 and the enhanced services complex 262 may be located in a regional data center. Each enhanced services complex 262 includes routers 264, layer 4-7 switches 266 and content servers or services 268 containing Internet content repositories, i.e. content cached from the Internet and/or content unique thereto, i.e., content that is not cached from the Internet and may or may not exist on the Internet. The content servers 268 store or cache Internet content therein and may serve as proxies or caches for certain Internet content providers. The content servers 268 utilize an Internet backdoor to obtain the contents to be stored. The routers 264 interface between the BAGs 260 and the layer 4-7 switches 266. The layer 4-7 switches 266 in turn interfaces with the content servers 268. The BAGs 260 interface with the routers 264 and the layer 4-7 switches 266 via high capacity lines such as DS3 line. Many complexes of content servers use Layer 4-7 switching to distribute requests for that content among multiple instances or replicants of the content. In so doing, these Layer 4-7 switches often translate the destination address from a general address identifying the content to specific destination addresses identifying a particular server.

As discussed above, Internet content providers generally provide Internet content 150 to Internet users via the Internet 136 and the ISPs 134. With the ATM packet network 200 of FIG. 3, Internet content may be additionally provided on the content servers 268 of the enhanced services complex 262. Specifically, the content servers 268 contain a content repository that mirror or cache certain of the Internet content 150. For example, Internet content providers may choose to mirror or cache their contents in the content servers 268. Additionally or alternatively, the ISPs may select certain Internet contents, e.g., popular contents, to be cached in the content servers 268. Alternatively, certain or all of the contents stored by the content servers may simply be available to all BAGs.

Such a content caching configuration enables the ATM packet network 200 to locate the cached Internet content closer to the CPE and to bypass the ISP 134 and the Internet 136. As such, the content servers 268 are preferably local to a metropolitan region. By locating certain of the Internet content within the enhanced services complex and thus closer to the subscribers, the ATM packet network 200 enables high speed access subscribers to access the cached content at higher speeds and greater reliability via DSL loops 118.

The ATM packet network 200 optionally provides a separate BAG 260 to interface with a specific ISP 134 in order to maintain separation or partition among the different ISPs 134. In the example shown in FIGS. 3 and 4, BAG 260A correspond to ISP 134A and BAG 260B corresponds to ISP 134B. The BAGs 260 may be physically distinct routers or virtual routers comprising one or more physical routers. In the case of virtual routers, the resources of BAGs 260 are dynamically assigned and the functions of the BAGs 260 are logically split to provide virtual routing to the different ISPs 134.

As each client subscribes to one of the ISPs 134, each respective CPE 110 interfaces with the BAG 160 corresponding to that ISP via a CPE-BAG PVC 252. Each CPE-BAG PVC 252 extends between a CPE 110 at the client premise and a BAG 260 corresponding to the ISP to which the client subscribes via a DSLAM 122 and ATM switches 232 of the ATM network 230. In the example shown in FIGS. 3 and 4, clients having CPEs 110A and 110C subscribe to ISP 134A such that PVCs 252A and 252C are established between BAG 260A corresponding to ISP 134A and CPEs 110A, 110C, respectively. In addition, clients having CPEs 110B and 110D subscribe to ISP 134B such that PVCs 252B and 252D are established between BAG 260B corresponding to ISP 134B and CPEs 110B, 110D, respectively. For purposes of clarity, only two exemplary PVCs 252A, 252D are shown in dashed lines between CPEs 110A, 110D and the BAGs 260, respectively.

Each BAG 260 also interfaces with the corresponding ISP 134 via a BAG-ISP connection 254. Specifically, a BAG-ISP connection 254 is established between each BAG 260 and the corresponding ISP 134. The BAG-ISP connections may be ATM PVCs via the ATM network 230 or any other suitable transport technology such as SONET or DS3. In the example shown in FIGS. 3 and 4, connections 254A, 254B are established between BAGs 260A, 260B and ISPs 134A, 134B, respectively.

Each BAG 260 further interfaces with each of some or all of the content servers 268 via a BAG-content server connection 256. The BAG-content server connections 256 may merely be logical connectivity through a packet network, such as an Ethernet, which includes routing of individual packets, for example. In particular, BAG-content server connections 256 are provided between each BAG 260 and the content servers to which the corresponding ISP 134 subscribes or has access. In other words, although certain of the Internet content is cached in the content servers 268, each ISP 134 may not subscribe to or have access to all contents cached in the content servers 268, but rather, optionally subscribes to and/or has access to some or all of the cached contents. Each BAG-content server connection 256 extends between a BAG 260 and one of the one or more corresponding content servers 268 via routers 264 and layer 4-7 switches 266. Routers 264 replicate and host the IP addresses of the content cached in the content servers 268.

In the example shown in FIG. 4, BAG 260A corresponding to ISP 134A subscribes to and/or has access to content A, D, and F cached in the content servers 268. Similarly, BAG 260B corresponding to ISP 134B subscribes to and/or has access to content A, B, C, and E cached in content servers 268. Although contents A–F are shown and described as cached in a respective content server 268, it is to be understood that content servers 268 are optionally virtual servers comprising one or more physically distinct servers. As is evident from the above description, the configuration of the network architecture 200 efficiently supports multiple ISPs for each set of content servers 268, rather than one ISP for each set of content servers 268.

Although the ATM packet network 200 has been described as provided by DSL utilizing ATM technology, it is to be understood that various modifications may be made while utilizing the same or similar concepts and configuration described above. For example, rather than DSL, other high-speed access services, such as cable access or wireless access, may be utilized. Furthermore, other transmission technologies, such as frame relay or dedicated private lines (e.g., DS1, DS3, OC-3), may be implemented.

Routing by the ATM Packet Network with BAGs and Enhanced Services Complex

The configuration of the ATM packet network 200 having been described, an overview of the routing of packets by the ATM packet network 200 will now be described with continued reference to the example shown in FIGS. 3 and 4.

The BAGs 260 selectively route data in packets between the CPEs 110 and either the content servers 268 in the enhanced services complex 262 or the Internet content 150 via the Internet 136 and the ISPs 134. When a client requests content, the corresponding BAG 260 determines whether the content is available via the enhanced services complex 262. If the BAG 260 determines that the content is not available via the enhanced services complex 262, the corresponding BAG 260 routes the traffic to the Internet 136 via the ISP 134. This situation occurs either when the requested content is not cached in the content servers 268 or when the corresponding ISP does not subscribe to or otherwise does not have access to the requested content cached in the content servers 268. Alternatively, if the BAG 260 determines that the content is available via the enhanced services complex 262, the corresponding BAG 260 routes the request to the content server 268 via the routers 264 and layer 4-7 switches 266. This situation occurs when the requested content is cached in the content servers 268 and that requested cached content is available to the corresponding ISP to which the client subscribes. The BAG 260 thus selectively routes traffic to the enhanced services complex that would otherwise be routed to the Internet 136 via the corresponding ISP 134.

The routing of traffic by the BAGs 260 between the CPE and content via the content servers 268 may be achieved in any suitable manner. As is known in the art, traffic generally refers to the flow of packets between a CPE at a client premise and a destination, such as the desired or requested Internet content. In addition, data to be transmitted over a packet network is divided into numerous packets. FIG. 5 schematically illustrates a packet 300. As shown, a packet 300 generally includes a block of data 302, a Layer 3 source IP address 304, and a Layer 3 destination IP address 306. The data block 302 may include Layer 4 source and destination information, e.g., the source and destination ports. The packet 300 may be sent from the source IP address 304 via the CPE at the client premise to the destination, such as the requested content, having the destination IP address 306. Replies follow the reverse path with the content server address as the source address and the address of the end user device, for example, as the destination address.

A BAG 260 receives packets 300 from the CPE 110 via the corresponding CPE-BAG PVC 252. The BAG 260 then utilizes the destination address 306 of the packet 300 to determine whether to route the packet to the ISP via the corresponding BAG-ISP connection 254 or to route the packet to the enhanced services complex 262 via the corresponding BAG-content server connection 256. Each BAG 260 optionally includes a destination address filter or destination address list to facilitate the BAG 260 in the routing determination. For example, the destination address list of each BAG 260 may include a list of all destination addresses that is to be routed to the enhanced services complex 262 via the corresponding BAG-content server connection 256. The filter address list may be continually updated by the BAG 260 as it promiscuously listens to the packets being transmitted therethrough. Thus, the destination address resides in two locations simultaneously: the Internet content 150 and as content in the servers 268 of the enhanced services complex 262.

In one embodiment, the BAGs 260 selectively route traffic by direct destination or destination redirection. In the destination redirection method of routing, after determining that the packet is to be routed to the enhanced services complex 262, the BAG 260 directly routes the packet without mapping the destination address 306.

In another embodiment, the BAGs 260 selectively route traffic by destination address translation or mapping. The destination address translation may be achieved utilizing layer 4 switching. In the destination address translation method of routing, the BAG preferably includes a list of destination addresses that is to be mapped as well as substitute destination addresses to which the corresponding destination addresses are to be mapped. Upon determining that the destination is in the list of destination addresses, the BAG 260 maps the destination address to the substitute destination address and routes the packet to the enhanced services complex. The substitute destination IP address is typically the IP address of the content cached in the content server 268.

Each BAG 260 may utilize multiple selective routing methods and the specific selective routing method utilized may be dependent upon the destination and/or the application of the requested destination content. Examples of destinations and/or applications include Yahoo™, http, RealNetworks™ audio stream, RealNetworks™ video stream, and Microsoft Media™ stream]. For example, for some destinations, the BAGs 260 may implement destination redirection while for other destinations, the BAGs 260 may implement destination address mapping. Although unlikely, different BAGs 260 may implement different selective routing methods for the same destination.

When the enhanced services complex 262 receives a packet from the BAG 260 via the connection 256, the layer 4-7 switches 266 of the enhanced services complex 262 preferably maps or translates the source address of the packet 300 to an ISP- or BAG-specific source IP address. The layer 4-7 switches 266 may achieve the source IP address translation with network address translation ("NAT") utilizing the port address, as is known in the art.

As each packet is received by the layer 4-7 switches 266 from a BAG 260, the layer 4-7 switches 266 discern the ISP 134 to which the BAG 260 at the other end of the BAG-content server connection 256 corresponds since each ISP corresponds to a unique BAG 260. The source IP address of the packet is mapped to a corresponding ISP-specific source IP address based upon, for example, predetermined rules and/or a listing for such mapping. In particular, the layer 4-7 switches 266 may be similar to Ethernet switches in that the layer 4-7 switches 266 may be configured with rules. Thus, if the rules are met, the layer 4-7 switches 266 can modify any or all layer 4-7 configurations, such as the IP address and/or Uniform Resource Locator ("AL"). Additionally, as is evident, source IP address translation allows multiple CPEs, each subscribing to a unique ISP, to have the same source address, because each ISP corresponds to a unique BAG. Further, by mapping the source IP address to a translated ISP-specific source IP address, the enhanced services complex 262 can easily determine the reverse BAG-content server connection 256 or path from the content server 268 to the appropriate BAG 260 and hence to the appropriate end user device.

In response to receiving packets from the CPE 110, the content server 268 transmits packets back to the CPE 110 via the BAG-content server connection 256 and the CPE-BAG PVC 252. Upon receiving packets from the content servers 268, the layer 4-7 switches 266 translates the ISP specific IP address to the original source IP address. The packet is then routed to the BAG 260 corresponding to the respective ISP via the connection 256. The BAG 260 then routes the packet to the destination CPE 110 via the ATM switches 232 of the ATM network 230.

Alternatively, the enhanced services complex 262 may directly route packets 300 from the content server to the appropriate BAG using the source IP address rather than mapping the source IP address to an ISP-specific IP address. To determine the return path of the packet from the content server 268 to the appropriate BAG, the enhanced services complex 262 may include a source IP address filter or address list which facilitates the enhanced services complex 262 in determining the BAG-content server connection 256 through which the packet should be routed. The listing preferably includes all source IP addresses and the BAGs or ISPs to which these source IP addresses correspond.

However, because each ISP corresponds to a set of source IP addresses, a large number of source IP addresses exists for all the ISPs in communication with the BAGs 260. As a result, the listing of all source IP addresses and the corresponding BAGs can be relatively large and would need to be updated as new source IP addresses are added. Thus, mapping of the source IP address to an ISP-specific IP address is preferred over direct source IP address direction.

Figure 6:
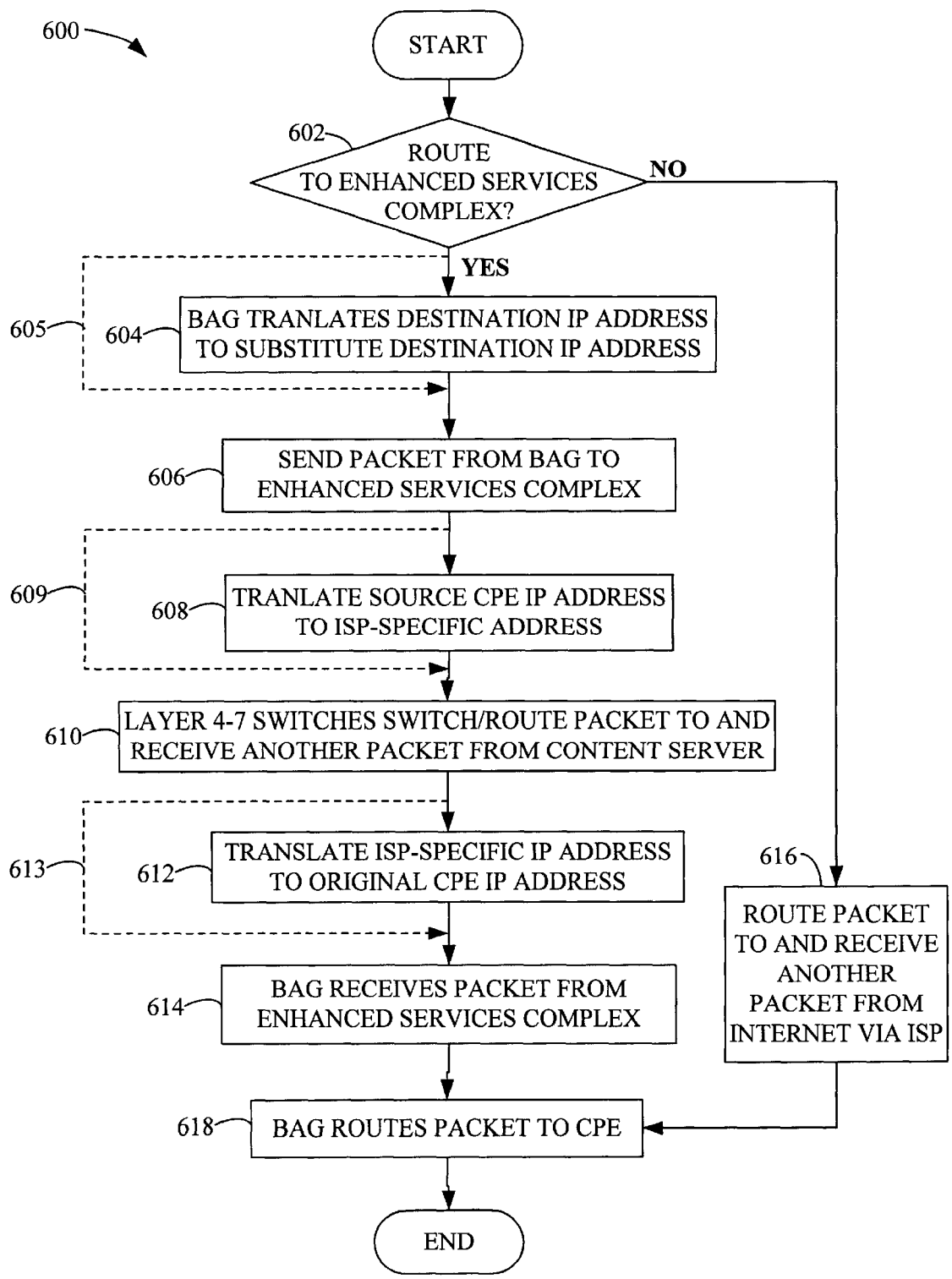
FIG. 6 is a flowchart illustrating the process of providing content to the client using the ATM packet network shown in FIGS. 3 and 4.

FIG. 6 is a flowchart illustrating the process 600 for providing broadband content to the client using the ATM packet network 200 shown in FIGS. 3 and 4. First, the BAG determines whether to route a packet to the enhanced services complex in step 602. If the packet is to be routed to the enhanced services complex and if destination address translation is employed, the BAG optionally translates the destination IP address of the packet to the substitute destination IP address in step 604. Alternatively, if destination redirection is employed and the packet is to be routed to the enhanced services complex, the process 600 may skip step 604 and proceed directly to step 606 as shown by dashed line 605.

In step 606, the BAG sends the packet to the content server of the enhanced services complex via a BAG-content server PVC. Then, in step 608, the enhanced services complex, or, more specifically, the layer 4-7 switches of the enhanced services complex, translates the source IP address to an ISP-specific address. Alternatively, if standard IP routing rather than source address translation is employed, the process 600 may skip step 608 and proceed directly to step 610 as shown by dashed line 609.

In step 610, the layer 4-7 switches switch or route the packet from the CPE to the destination content server and receives another packet from the content server in response to the packet from the CPE with the originating source as the destination. Then, in step 612, the layer 4-7 switches translate the ISP-specific address to the original end user source address if source address translation of step 608 was executed. Alternatively, if direct source IP address direction is employed, the process 600 may skip step 612 and proceed directly to step 614 as shown by dashed line 613.

However, if the BAG determines in step 602 that the packet is not to be routed to the enhanced services complex, then the packet is routed to the Internet via the ISP and an Internet content packet is transmitted to the corresponding BAG via the Internet and the corresponding ISP in step 616. The Internet content packet includes the original end user source address as the destination IP address.

Finally, upon receiving the packets from the content servers of the enhanced services complex or the Internet content via the Internet and the ISP, the corresponding BAG then routes the packets to the CPE in step 618.

While the above is a complete description of preferred embodiments of the invention, various alternatives, modifications, and equivalents can be used. Therefore, the above description should not be taken as limiting the scope of the invention that is defined by the metes and bounds of the appended claims along with their full scope of equivalents.

What is claimed is:

1. A method for providing broadband content to high speed subscribers, comprising:
   routing client data packets from a client premise equipment at a client premise to a broadband access gateway, said broadband access gateway being in communication with at least one Internet service provider and an enhanced services complex having at least one content server;
   selectively routing each client data packet from the broadband access gateway to one of the Internet via said Internet service provider and said enhanced services complex;
   routing the client data packet to an Internet content in communication with the Internet where the client data packet is selectively routed to the Internet via said Internet service provider;
   routing the client data packet to one of the at least one content server having Internet content stored therein where the client data packet is selectively routed to said content server via said enhanced services complex; and
   routing content data packets from one of said Internet content and said content server to said client premise equipment.

2. The method for providing broadband content to high speed subscribers of claim 1, wherein said routing client data packets from the client premise equipment to the broadband access gateway is via switches in a network.

3. The method for providing broadband content to high speed subscribers of claim 2, wherein the network is selected from the group consisting of wireless network, DSL network, and cable network.

4. The method for providing broadband content to high speed subscribers of claim 1, wherein said selectively routing each client data packet from the broadband access gateway to one of the Internet and said enhanced services complex includes determining the routing of the client data packet based upon a destination address of the client data packet and upon a destination address filter.

5. The method for providing broadband content to high speed subscribers of claim 1, wherein said selectively routing each client data packet from the broadband access gateway to one of the Internet and said enhanced services complex includes destination redirection of the client data packet where the client data packet is routed to said enhanced services complex.

6. The method for providing broadband content to high speed subscribers of claim 1, wherein said selectively routing each client data packet from the broadband access gateway to one of the Internet and said enhanced services complex includes translation of a destination address of the client data packet to a substitute destination address where the client data packet is routed to said enhanced services complex.

7. The method for providing broadband content to high speed subscribers of claim 6, wherein said destination address translation utilizes layer 4 switching.

8. The method for providing broadband content to high speed subscribers of claim 6, wherein said substitute destination address is address of the content cached in said content server.

9. The method for providing broadband content to high speed subscribers of claim 1, wherein said broadband access gateway is in communication with a plurality of said Internet service provider, each client data packet is associated with one of said Internet service providers, said broadband access gateway having at least one router corresponding to each Internet service provider.

10. The method for providing broadband content to high speed subscribers of claim 9, wherein at least one of said broadband access gateway routers is a virtual router.

11. The method for providing broadband content to high speed subscribers of claim 9, wherein said routing the client data packet to the content server includes translating a client source address of the client data packet to a substitute client source address for facilitating routing of said content data packet from said enhanced services complex to the client premise equipment via the broadband access gateway router corresponding to the Internet service provider associated with said client data packet.

12. The method for providing broadband content to high speed subscribers of claim 11, wherein said routing said content data packets from said content server to said client premise equipment includes translating said substitute client equipment address of the client data packet to the client equipment address to identify the Internet service provider with which said client data packet is associated.

13. The method for providing broadband content to high speed subscribers of claim 12, wherein said translating the substitute client equipment address of the client data packet to the client equipment address is performed by layer 4-7 switches of said enhanced services complex.

14. The method for providing broadband content to high speed subscribers of claim 1, wherein said routing each client data packet from said broadband access gateway to the Internet via said Internet service provider comprises providing a virtual circuit between each Internet service provider and a corresponding one of at least one functionally divided virtual gateway of the broadband access gateway.

15. The method for providing broadband content to high speed subscribers of claim 1, wherein said routing the client data packets from the client premise equipment to the broadband access gateway comprises providing a virtual circuit between each client premise equipment and a corresponding one of at least one functionally divided virtual gateway of the broadband access gateway.

16. The method for providing broadband content to high speed subscribers of claim 1, wherein said selective routing of each client data packet from the broadband access gateway to the enhanced services complex comprises providing connectivity between each of at least one functionally divided virtual gateway of the broadband access gateway and at least a portion of the content servers corresponding to the virtual gateway.

17. The method for providing broadband content to high speed subscribers of claim 1, wherein said routing the client data packet to the content server is via routers and layer 4-7 switches of the enhanced services complex.

18. The method for providing broadband content to high speed subscribers of claim 1, wherein content server stores at least one of content cached from the Internet and content unique thereto.

19. A network for providing broadband content to high speed subscribers, comprising:
    an enhanced services complex having at least one content server having Internet content cached therein; and
    a broadband access gateway in communication with said enhanced services complex and to at least one Internet service provider, said broadband access gateway is configured to transmit and receive data traffic to and from a client premise equipment at a client premise, respectively;
    wherein said broadband access gateway is configured to selectively route data traffic received from the client premise equipment to one of the at least one content server at the enhanced services complex and the Internet service provider based on multiple instances of the content destination address.

20. The network for providing broadband content to high speed subscribers according to claim 19, further comprising a network of switches in communication with said broadband access gateway, said data traffic to and from the client premise equipment being directed through said network of switches.

21. The network for providing broadband content to high speed subscribers according to claim 20, where in the network is selected from the group consisting of wireless network, DSL network, and cable network.

22. The network for providing broadband content to high speed subscribers according to claim 20, wherein said network of switches is an ATM network of switches.

23. The network for providing broadband content to high speed subscribers according to claim 20, further comprising a gateway-client virtual circuit extending between the broadband access gateway and the client premise equipment via said network of switches, said client-gateway virtual circuit being configured to transmit data traffic between said broadband access gateway and the client premise equipment.

24. The network for providing broadband content to high speed subscribers according to claim 19, wherein said enhanced services complex further includes switches in communication with the at least one content server and routers in communication with the switches and the broadband access gateway, said switches being configured to execute switching utilizing any of layers 4-7.

25. The network for providing broadband content to high speed subscribers according to claim 24, wherein said layer 4-7 are transport, session, presentation and application layers, respectively.

26. The network for providing broadband content to high speed subscribers according to claim 19, further comprising a gateway-Internet service provider link extending between the broadband access gateway and the Internet service provider, said gateway-Internet service provider virtual circuit being configured to transmit data traffic between the broadband access gateway and the Internet service provider.

27. The network for providing broadband content to high speed subscribers according to claim 19, further comprising a gateway-content server connection extending between the broadband access gateway and the at least one content server, said gateway-content server connection being configured to transmit data traffic between the broadband access gateway and the at least one content server.

28. The network for providing broadband content to high speed subscribers according to claim 19, further comprising an access multiplexer in communication with the client premise equipment and the network of switches, said access multiplexer being configured to switch data traffic between the client premise equipment and the broadband access gateway.

29. The network for providing broadband content to high speed subscribers according to claim 28, wherein said access multiplexer is a digital subscriber line access multiplexer.

30. The network for providing broadband content to high speed subscribers according to claim 19, wherein said broadband access gateway comprises a first and a second virtual gateway, said network further comprising:
    a first gateway-Internet service provider connection extending between the first virtual gateway and the first Internet service provider and configured to transmit data traffic between the first virtual gateway and the first Internet service provider; and
    a second gateway-Internet service provider connection extending between the second virtual gateway and the second Internet service provider and configured to transmit data traffic between the second virtual gateway and the second Internet service provider.

31. The network for providing broadband content to high speed subscribers according to claim 30, wherein said enhanced services complex comprises a plurality of said content servers, said network further comprising:
    a first set of gateway-content server connections extending between the first virtual gateway and each of a first subset of the plurality of content servers, each of said first gateway-content server connections being configured to transmit data traffic between the first virtual gateway and a corresponding one of the first subset of the content servers; and
    a second set of gateway-content server connections extending between the second virtual gateway and each of a second subset of the plurality of content servers, each of said second gateway-content server connections being configured to transmit data traffic between the second virtual gateway and a corresponding one of the second subset of the content servers.

32. The network for providing broadband content to high speed subscribers according to claim 31, wherein said first subset of said content servers correspond to the first Internet service provider and said second subset of said content servers correspond to the second Internet service provider.

* * * * *